United States Patent [19]

Eckle et al.

[11] Patent Number: 4,714,390
[45] Date of Patent: Dec. 22, 1987

[54] BORING TOOL

[75] Inventors: Otto Eckle, Loechgau; Walter Roser, Besigheim, both of Fed. Rep. of Germany

[73] Assignee: Komet Stahlhalter und Werkzeugfabrik Robert Breuning GmbH, Besigheim, Fed. Rep. of Germany

[21] Appl. No.: 885,068

[22] Filed: Jul. 14, 1986

[30] Foreign Application Priority Data

Jul. 18, 1985 [DE] Fed. Rep. of Germany ... 8520724[U]

[51] Int. Cl.$^4$ ............................................. B23B 29/26
[52] U.S. Cl. ................... 409/234; 82/36 A; 408/239 R
[58] Field of Search ............ 408/239 R, 191, 193, 408/197, 198, 146, 185; 82/36 R, 36 A; 409/232, 234

[56] References Cited

U.S. PATENT DOCUMENTS 3,109,336 11/1963 Rozum ........................... 82/36 A
3,375,742  4/1968 Sturm ........................... 82/36 A X
3,742,792  7/1973 Willen ........................ 408/239 R X
4,486,131 12/1984 Eckle .......................... 82/36 A X

FOREIGN PATENT DOCUMENTS 8001066 4/1980 Fed. Rep. of Germany.
2094191 9/1982 United Kingdom ........... 408/239 R Primary Examiner—Gil Weidenfeld
Assistant Examiner—Glenn L. Webb
Attorney, Agent, or Firm—Flynn, Thiel, Boutell & Tanis

[57] ABSTRACT

The mounting body (1) of the boring tool, which is of a hub-like configuration, is provided, at locations which are diametrally oppositely disposed with respect to the axis of rotation (D) of the mounting body, with a respective mounting bore (3) with its axis (A) extending radially with respect to the axis of rotation (D), the mounting bore being surrounded by a respective abutment surface (4) extending perpendicularly with respect to the axis (A) of the mounting bore (3). A tool head (5) is provided with a fitting spigot (6) which fits into the mounting bore (3) and which is concentrically surrounded by an annular surface (7) extending perpendicularly with respect to the axis (A) of the fitting spigot. A respective intermediate portion can optionally be fitted between the mounting body (1) and the respective tool head (5), the connecting parts of the intermediate portion corresponding to those of the mounting body (1) and the tool head (5). The tool head (5) can be connected to the mounting body (1) directly or with the interposition of the intermediate portion, by way of clamping devices (8-13).

2 Claims, 4 Drawing Figures

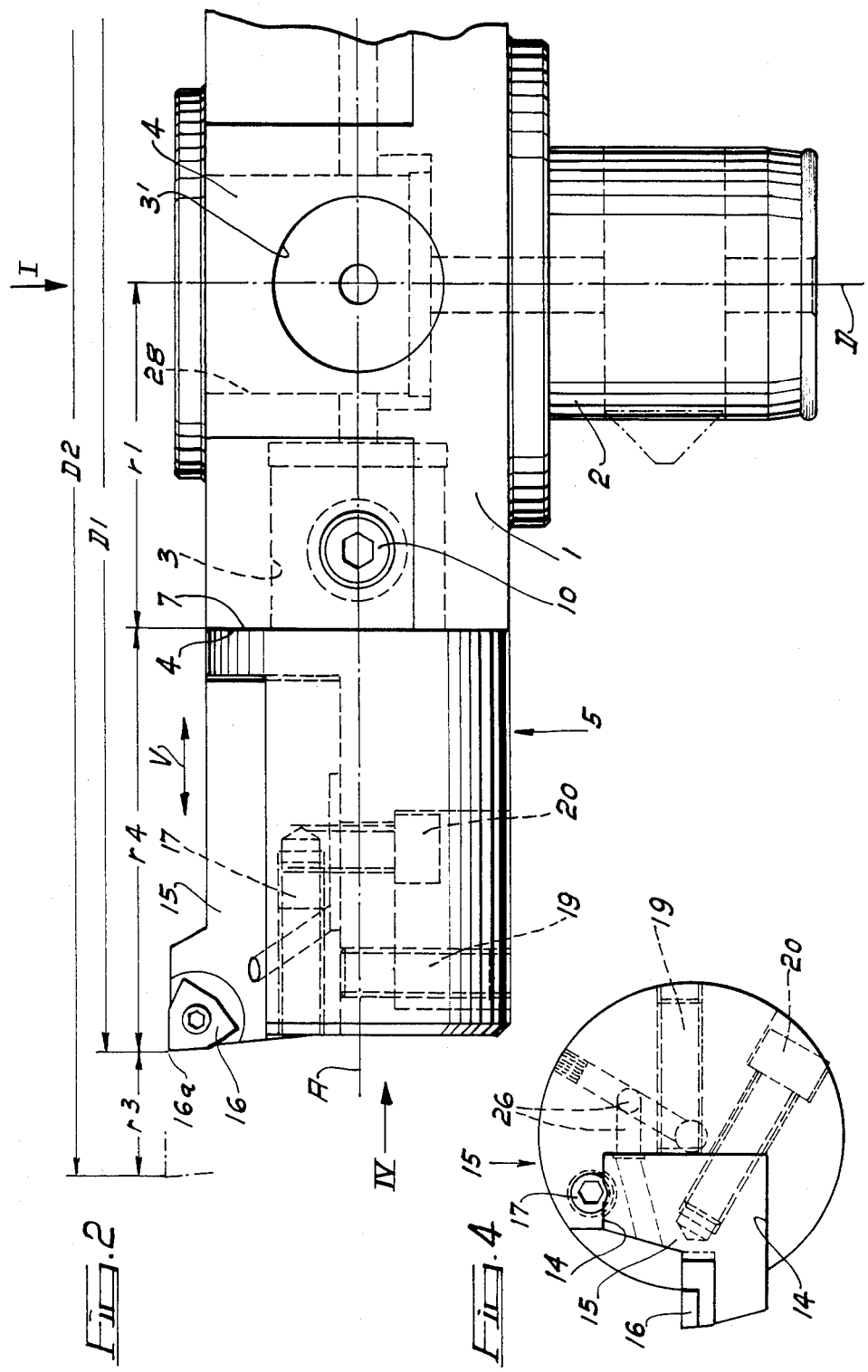

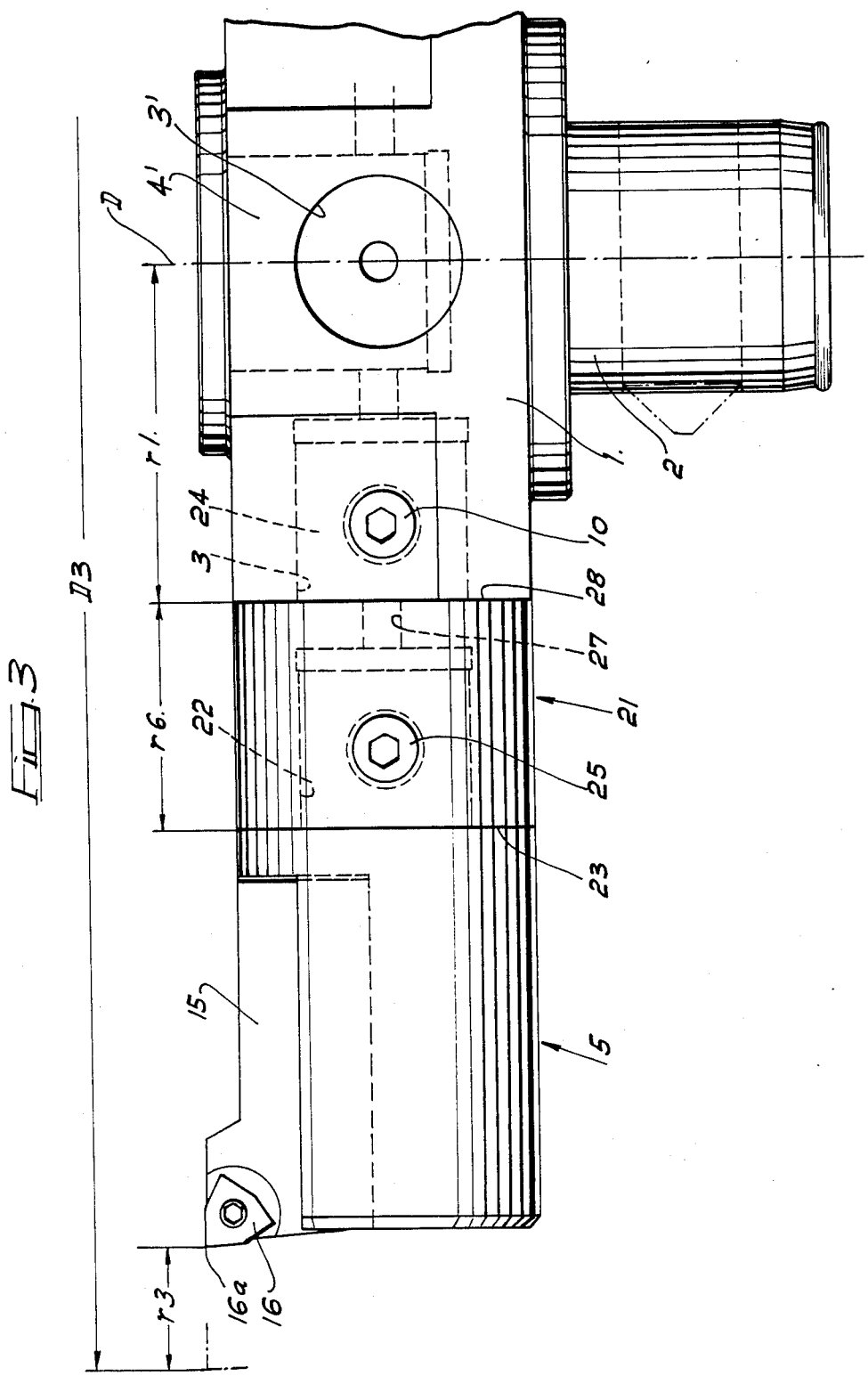

BORING TOOL

FIELD OF THE INVENTION

The invention relates to a boring tool, comprising a mounting body which can be connected to a machine tool spindle and which has a respective radially extending mounting for the shank of a respective tool head at each of two locations which are diametrally oppositely disposed with respect to its axis of rotation, and which has an abutment surface which fixes the respective tool head in the radial direction with respect to the mounting body, further comprising a cutting bit carrier which has a cutting bit and which is radially displaceable on each tool head with respect to the axis of rotation, and further comprising a clamping means with which the tool head can be connected to the mounting body.

BACKGROUND OF THE INVENTION

Boring tools of that kind are used for the inside turning of bores or concavely curved surfaces on workpieces, with a diameter of about 200 mm to 1 m and more. In a known tool of the kind set forth above, the mounting body substantially comprises a transverse member which is provided at both ends, at the end face thereof, with guides of square or rectangular cross-section which extend radially with respect to the axis of rotation of the transverse member. The shank of a respective tool head is radially displaceably guided in each of the guides, the shanks also being of square or rectangular cross-section. A respective fitting pin which is let into the transverse member engages into a respective one of three fitting bores which are provided in the shank of the tool head and which are disposed at a spacing from each other in the radial direction. Each tool head can be adjusted stepwise relative to the transverse member by means of the fitting bores and the fitting pin. The fitting pin thus forms an abutment surface which fixes the tool head relative to the mounting body in the radial direction. The tool head itself is releasably connected to the transverse member by means of a plurality of screws. After the tool head has been adjusted in a stepwise manner by means of the fitting pin and the fitting bores, setting of the desired machining diameter is effected by the cutting bit carrier being displaced in the radial direction with respect to the tool head. That known boring tool is comparatively expensive to produce, because of its guides of square or rectangular cross-section. Furthermore, the range of diameters which can be machined with one and the same transverse member is comparatively small. Thus one transverse member is suitable for example for machining diameters which are between 355 and 520 mm. Another transverse member is required for the range of diameters from 520 to 685 mm.

The invention is based on the problem of providing a boring tool of the kind set forth in the opening part of this specification, which permits machining over the maximum possible range of diameters, while being simple to produce and particularly stable. The invention further seeks to provide that precise presetting of the working diameter is also possible, using simple measuring equipment.

The invention provides that the mounting body which is of a hub-like configuration is provided at locations which are diametrally oppositely disposed with respect to its axis of rotation with a respective mounting bore with its axis extending radially with respect to the axis of rotation, the bore being surrounded by an abutment surface extending perpendicularly to the axis of the mounting bore, and that the tool head is provided with a fitting spigot which fits into the mounting bore and which is concentrically surrounded by an annular surface extending perpendicularly with respect to the axis of the fitting spigot, and with at least one respective intermediate portion which can optionally be fitted between the mounting body and the tool head and whose one end has a mounting bore with radial abutment surface, corresponding to the mounting bore in the mounting bore, and whose other end has a fitting spigot with an annular surface, corresponding to the fitting spigot of the tool head.

The mounting bores of the mounting body and the fitting spigots of the tool head are comparatively simple to produce. The range of diameters in respect of which one and the same mounting body can be used is comparatively large by virtue of using one or possibly a plurality of intermediate portions. Thus for example a single mounting body can be used for a range of diameters of from 398 to 762 mm, while only one further mounting body is required for the next range of diameters of from 698 to 1342 mm. The intermediate portions used may also be extension portions as are conventionally employed in system boring tools (for example the Komet-ABS-attachment tools with plug-in connection). In addition, the same intermediate portions can also be used in connection with mounting bodies which are intended for another range of diameters. The novel boring tool is also distinguished by a considerable degree of stiffness so that it is possible to operate with comparatively high forward feed rates. In addition, the tool gives a high degree of accuracy in regard to change. That provides that the cutting edge can be accurately preset on the tool head, outside the machine, on a presetting apparatus, using comparatively simple measuring equipment. That operation does not require any large measuring tool which corresponds to the respective large working diameter. When the tool head with the preset cutting edge on the mounting body is re-connected to the mounting body directly or by way of the interposition of an intermediate portion, the precise length of which is known, and that can be done with a small number of manual operations, then the boring tool is already of the desired machining diameter without any need for further measurement or setting of the tool on the machine itself. That substantially reduces the setting and preparation times on the machine.

An advantageous embodiment of the boring tool according to the invention provides that the mounting body has two further, diametrally oppositely disposed, radial mounting bores whose axes are each arranged in a displaced relationship through 90° in the direction of rotation of the mounting body relative to the axes of the respective two first mounting bores, and that the abutment surfaces of the second mounting bores are at a different spacing from the axis of rotation from the abutment surfaces of the first mounting bores. That provides additional options in regard to variation of the machining diameter, depending on whether the tool heads are fitted into the first or the second mounting bores.

An advantageous embodiment in that respect provides that the spacings of the abutment surfaces of the mounting bores differ by an amount which is somewhat smaller than the maximum radial adjustment travel of the cutting bit carrier on the tool head.

BRIEF DESCRIPTION OF THE DRAWINGS

The invention is described in greater detail hereinafter with reference to an embodiment as illustrated in the drawings in which:

FIG. 2 is a view in the direction indicated by II in FIG. 1, FIG. 3 is a similar view when using an intermediate portion, and FIG. 4 is a side view in the direction indicated by IV in FIG. 2.

DETAILED DESCRIPTION

Figure 1:
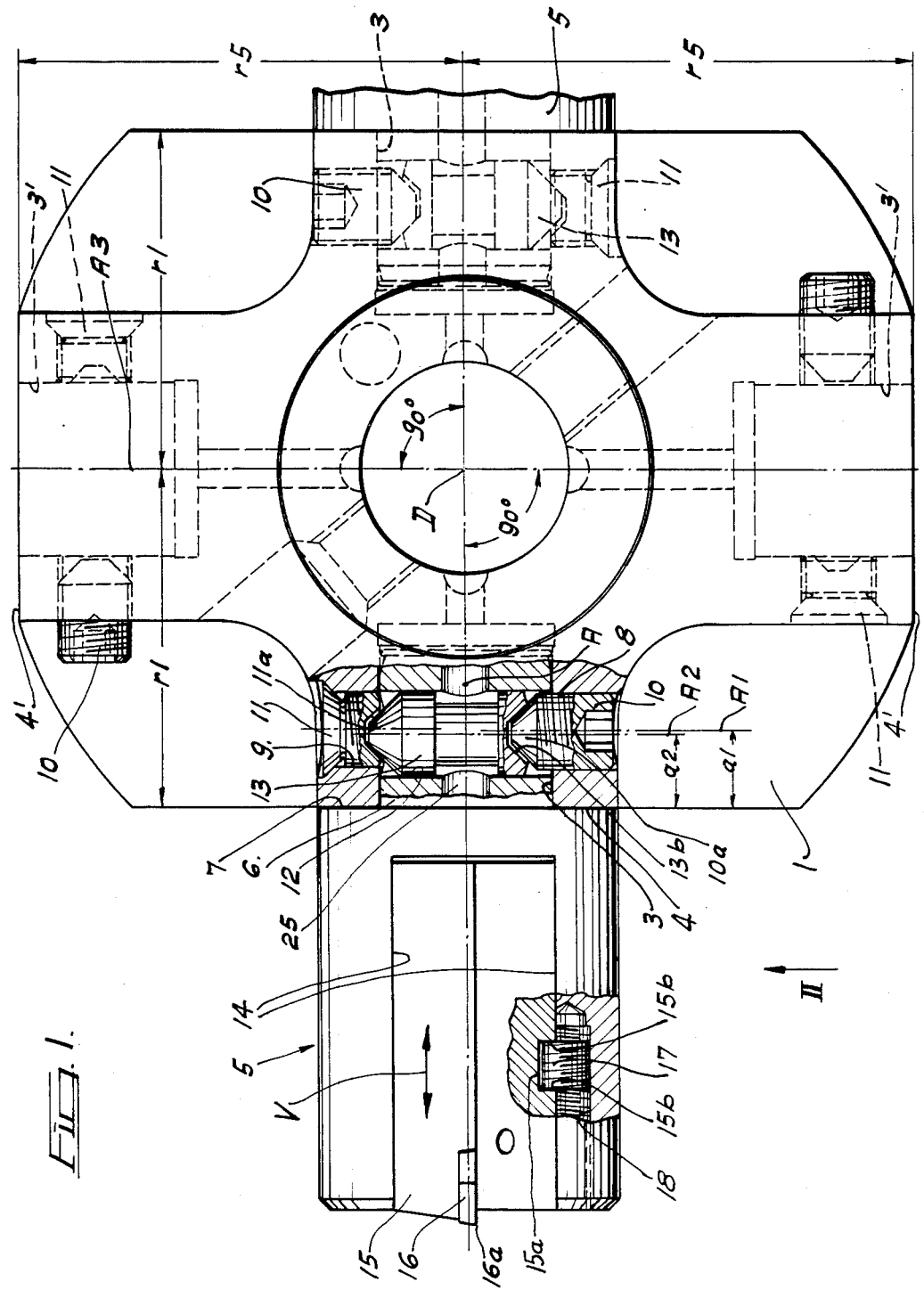
FIG. 1 shows an end view of the boring tool viewing in the direction indicated at I in FIG. 2.

The mounting body 1 has a fitting spigot 2 with which it can be fitted directly into a cylindrical mounting bore of a machine tool spindle (not shown) or into a corresponding mounting bore of an adaptor flange which can be connected to the machine tool spindle. In that respect the connection to the machine tool spindle is made in a manner as described for example in EP-A 0 123 220.

At two locations which are diametrally oppositely disposed with respect to its axis of rotation D, the mounting body 1 has two cylindrical mounting bores 3. As those two mounting bores and the adjacent parts are completely identical, the same reference numerals are also used. The description set out hereinafter of one of the mounting bores also applies in corresponding fashion to the other mounting bore.

The axis A of the mounting bore extends radially with respect to the axis of rotation D. The mounting bore 3 is surrounded by an annular abutment surface 4 which extends normal to the axis A of the mounting bore. The tool head 5 is provided with a fitting spigot 6 which fits into the mounting bore 3. The fitting spigot 6 is concentrically surrounded by an annular surface 7 which extends perpendicularly with respect to the axis of the fitting spigot 6. The fitting spigot 6 can be fitted into the mounting bore 3. The two abutment surfaces 4 are at the same spacing r1 from the axis of rotation D.

The per se known clamping arrangement which is shown in greater detail in FIG. 1 is advantageously used for connecting the tool head 5 to the mounting body 1. Provided in the region of the mounting bore 3 are two diametrally oppositely disposed female screwthreads 8 and 9 which extend radially with respect to the axis A and into each of which can be screwed a respective clamping screw 10 and 11. The clamping screw 10 has a conical projection 10a and the clamping screw 11 has a frustoconical recess 11a. A clamping pin 13 is mounted displaceably in a transverse bore 12 in the fitting spigot 6. At its one end, the clamping pin 13 has a conical projection 13a which corresponds to the conical recess 11a while at its other end it has a recess 13b corresponding to the conical projection 10a. The spacing a1 of the axis A1 of the female screwthreads 8 and 9 from the abutment surface 4 is somewhat larger than the spacing a2 of the axis A2 of the transverse bore 12 from the annular surface 7 so that, when one of the clamping screws, preferably the clamping screw 10, is tightened, the clamping pin 13 is urged towards the interior of the mounting bore 3. That causes the annular surface 7 to be firmly pressed against the abutment surface 4. A corresponding clamping arrangement is then also provided at the diametrally oppositely disposed mounting bore 3.

The tool head 5 has a cutting plate or bit carrier 15 which is displaceably axially with respect to its axis A but radially with respect to the axis of rotation D, in a guide 14. At its free end, the cutting bit carrier 15 carries a replaceable cutting plate or bit 16. A setting screw 17 can be screwed in the screwthread 18 in the tool head 5. The screwthread extends in the direction of adjustment V of the cutting bit carrier 15. The setting screw 17 engages with approximately one third of its periphery into an opening 15a in the cutting bit carrier 15 and bears with its end faces against the end faces 15b of the opening 15a. When the screw 17 is turned, it moves in the screwthread 18 in the direction of adjustment V and entrains the cutting bit carrier 15 therewith, by virtue of its engagement into the opening 15a. The setting screw 19 which extends parallel to the axis of rotation D can also displace the cutting bit carrier slightly in the direction of the axis of rotation D. Adjustment of that kind is required so that the effective cutting tips 16a of two diametrally oppositely disposed tool holders 15 operate in the same radial plane. The cutting bit carrier 15 with the cutting bit 16 can be adjusted by means of the setting screw 17 by the maximum adjustment travel r3, in the illustrated embodiment being about 32 mm.

Such setting may be carried out in a presetting device which has a similar cylindrical mounting bore to the mounting body 1. The respective spacing between the annular surface 7 and the cutting tip 16a is measured in the presetting device. The spacing r4 which is to be set in the presetting device can be easily calculated. If D1 is the desired operating diameter of the boring tool and r1 is the known spacing of the abutment surface 4 from the axis of rotation D, then the following formula applies:

$$r4 = 0.5 \times D1 = r1.$$

Therefore, in the presetting device, it is only ever necessary to set the spacing r4 by means of the screw 17 and the axial position of the cutting tip 16a by means of the setting screw 19. When that adjustment has been effected, the clamping screw 20 is tightened. The tool head 5 with the preset cutting plate 16 can then be very quickly fitted into the mounting bore 3 in the mounting body 1 and firmly connected to the mounting body 1 by tightening the clamping screw 10. The same also applies in regard to the tool head 5 (not shown) at the diametrally oppositely disposed side.

Radial adjustment of the cutting bit carriers 15 makes it possible to set diameters which differ from each other by $2 \times r3$, that is to say, 64 mm. If now the mounting body 1 is also to be used for machining larger diameters, then it is desirable for it to have two further mounting bores 3' which in turn are arranged in diametrally oppositely disposed relationship but whose axes A3 are arranged in displaced relationship through 90° in the direction of rotation of the mounting body 1. The configuration of the mounting bores 3' precisely corresponds to the configuration of the mounting bores 3, with the sole difference that the abutment surface 4' of the mounting bore 3' is at a larger spacing r5 from the axis of rotation D. The difference between the spacings r5 and r1 is somewhat smaller than the maximum radial adjustment travel r3 of the cutting bit carrier 15. If for example r1 is 89 mm, then r5 should be 119 mm. For diameters which are larger than the maximum possible working diameter D2 which can be achieved with tool heads 5 fitted into the mounting bores 3, the tool heads are removed from the mounting bores 3 and fitted into the mounting bores 3' and clamped fast with clamping screws 10 which precisely correspond to the clamping screws 10 as described hereinbefore.

For machining diameters which are larger than the maximum possible working diameter which can be achieved with tool heads fitted into the mounting bores 3', the mounting bores 3 are used once again. In that case however, as shown in FIG. 3, an intermediate portion 21 is arranged between the tool head 5 and the mounting body 1 which is shown herein only in diagrammatic form. The intermediate portion 21 has a mounting bore 22 which precisely corresponds to the mounting bore 3 and which is also surrounded by an abutment surface 23 which serves as a support for the annular surface 7 of the tool head 5. The intermediate portion 21 further has a fitting spigot 24 which corresponds to the fitting spigot 6 of the tool head 5 and which therefore also fits into the mounting bore 3. The fitting spigot 24 is provided with a clamping pin which corresponds to the clamping pin 13. The intermediate portion also has clamping screws which correspond to the clamping screws 10 and 11, FIG. 3 only showing the clamping screw 25 thereof. The length r6 of the intermediate portion 21 in turn corresponds to the difference between the spacings r5 and r1. It is 60 mm, in the illustrated embodiment.

If the arrangement is to be used for machining diameters which are larger than the maximum possible working diameter D3 of the boring tool with intermediate portion 21, in the setting shown in FIG. 3, then the intermediate portion 21 is released from the mounting body 1, while remaining connected to the tool head 5. The intermediate portion 21 is then fitted with its spigot 24 into one of the mounting bores 3', for the purposes of machining the larger diameters. The working range of the boring tool can be further increased by using either a further intermediate portion of a length r6 or a single intermediate portion of double the length. In that way it is possible to machine diameters which are between 398 and 762 mm, with the mounting body shown in the drawing.

Another matter of substantial significance in boring or inside turning operations is that coolant can reach the cutting bit 16 from the mounting body 1 by way of coolant bores 25 and 26 which are provided in the tool head and coolant bores 27 which are provided in the intermediate portion 21, irrespective of the way in which the tool head 5 is assembled to the mounting body.

Instead of the illustrated tool heads which have cutting bit carriers 15 with cutting bits 16 for roughing machining, it is also possible to fit other tool heads (not shown) with very finely adjustable cutting bit carriers for final machining of a workpiece.

In addition, the mounting body 1 may be provided with a further mounting bore 28 which is coaxial with respect to the mounting spigot 2 thereof and into which can be fitted other tools, for example a milling head, a boring bar, a reamer or broach or the like. It is then possible, with a combined boring tool of that kind, to carry out a plurality of associated machining operations on the workpiece in one clamping operation.

The embodiments of the invention in which an exclusive property or privilege is claimed are defined as follows:

1. In a boring tool, comprising a mounting body which can be connected to a machine tool spindle having an axis of rotation and which has a respective radially extending mounting for the shank of a respective tool head at each of two locations which are diametrically oppositely disposed with respect to its axis of rotation, and which has an abutment surface which fixes the respective tool head in the radial direction with respect to said mounting body, further comprising a cutting bit carrier which has a cutting bit and which is radially displaceable on each tool head with respect to said axis of rotation, and further comprising a clamping means with which the tool head can be connected to said mounting body, wherein the improvement comprises said mounting body, which is of a hub-like configuration, being provided at locations which are diametrically oppositely disposed with respect to said axis of rotation with a respective first mounting bore with having an axis extending radially with respect to said axis of rotation, said first mounting bores being each surrounded by a first abutment surface extending perpendicularly to said axis of said mounting bores, wherein said tool head is provided with a fitting spigot which fits into each of said first mounting bores and which is concentrically surrounded by an annular surface extending perpendicularly with respect to an axis of said fitting spigot, said mounting body having two further, diametrically oppositely disposed, radial second mounting bores whose axes are arranged in displaced relationship through 90° in the direction of rotation of said mounting body with respect to said axes of said first mounting bores, wherein second abutment surfaces of said second mounting bores are at a different spacing from said axis of rotation than said first abutment surfaces of said first mounting bores and wherein the spacings of said first and second abutment surfaces of said first and second mounting bores differ by an amount which is somewhat smaller than the maximum radial adjustment travel of the cutting bit carrier on said tool head.

2. A tool according to claim 1, wherein at least one respective intermediate portion is provided which can optionally be fitted between said mounting body and said tool head and whose one end has a further mounting bore with a radial abutment surface, corresponding to said mounting bore in said mounting body, and whose other end has a fitting spigot with an annular surface corresponding to said fitting spigot of said tool head.

* * * * *